US009316790B2

(12) United States Patent
Kamocsai et al.

(10) Patent No.: US 9,316,790 B2
(45) Date of Patent: Apr. 19, 2016

(54) FACETED, GERMANIUM SLOTTED WAVEGUIDE

(71) Applicant: BAE Systems Information and Electronic Systems Integration Inc., Nashua, NH (US)

(72) Inventors: Robert L. Kamocsai, Manassas, VA (US); Vu A. Vu, Falls Church, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/734,666

(22) Filed: Jun. 9, 2015

(65) Prior Publication Data

US 2015/0277045 A1    Oct. 1, 2015

Related U.S. Application Data

(62) Division of application No. 13/647,128, filed on Oct. 8, 2012, now Pat. No. 9,116,290.

(60) Provisional application No. 61/544,335, filed on Oct. 7, 2011.

(51) Int. Cl.
| G02B 6/12 | (2006.01) |
| G02B 6/10 | (2006.01) |
| G02F 2/02 | (2006.01) |
| G02B 6/13 | (2006.01) |
| G02B 6/122 | (2006.01) |

(52) U.S. Cl.
CPC ........ *G02B 6/131* (2013.01); *G02B 6/12* (2013.01); *G02B 6/122* (2013.01); *G02B 2006/12061* (2013.01)

(58) Field of Classification Search
CPC ...... G02B 6/00; G02B 27/142; G02B 27/149; G02B 6/12; G02B 6/26; G02B 6/10
USPC ........................................................ 385/14
See application file for complete search history.

(56) References Cited

U.S. PATENT DOCUMENTS

| 3,831,115 | A | * | 8/1974 | Coldren | .............. | H03H 9/42 333/150 |
| 4,466,696 | A | * | 8/1984 | Carney | .............. | G02B 6/30 372/7 |
| 5,260,587 | A | * | 11/1993 | Sato | .............. | G02B 6/4249 257/82 |
| 5,343,544 | A | * | 8/1994 | Boyd | .............. | B29D 11/0075 264/1.1 |
| 5,359,687 | A | * | 10/1994 | McFarland | .............. | G02B 6/138 385/49 |

(Continued)

FOREIGN PATENT DOCUMENTS

JP          63131118 A  *  6/1988

OTHER PUBLICATIONS

Mathieu et al. "Integration of germanium waveguide phtotodetectors for optical intra-chip interconnects", Micro-Optics, VCSELs, and Photonic Interconnects, edited by Hugo Thienpont, Kent D. Choquette, Mohammad R. Taghizadeh, Proceedings of SPIE vol. 5453 (SPIE, Bellingham, WA, 2004) 1—Institut d'Electronique Fondamentale, CNRS UMR 8622.

*Primary Examiner* — Kaveh C Kianni
(74) *Attorney, Agent, or Firm* — Daniel J. Long

(57) ABSTRACT

A waveguide having a substrate, a first germanium sidewall and a second germanium sidewall. The waveguide is formed by growing the first germanium sidewall and second germanium sidewall on the substrate.

9 Claims, 4 Drawing Sheets

(56) References Cited

U.S. PATENT DOCUMENTS

| | | | | |
|---|---|---|---|---|
| 5,515,464 A * | 5/1996 | Sheem | G02B 6/2808 | 385/131 |
| 5,712,937 A * | 1/1998 | Asawa | G02B 6/12007 | 385/12 |
| 5,980,831 A | 11/1999 | Braiman et al. | | |
| 6,438,279 B1 * | 8/2002 | Craighead | G02B 6/136 | 356/246 |
| 6,556,734 B1 * | 4/2003 | Bischel | G02F 1/011 | 385/130 |
| 6,885,795 B1 * | 4/2005 | Hsu | G02B 6/12004 | 385/48 |
| 6,954,570 B2 | 10/2005 | Hunt et al. | | |
| 7,139,459 B2 | 11/2006 | Kochergin et al. | | |
| 7,256,667 B1 * | 8/2007 | Forman | G02B 6/102 | 333/137 |
| 7,305,157 B2 | 12/2007 | Ahn et al. | | |
| 7,883,839 B2 | 2/2011 | Donnelly et al. | | |
| 2002/0051607 A1 * | 5/2002 | Ido | G02B 6/125 | 385/49 |
| 2002/0136517 A1 * | 9/2002 | Ruschin | G02B 6/1221 | 385/132 |
| 2002/0190623 A1 * | 12/2002 | Chen | B82Y 10/00 | 313/310 |
| 2003/0002771 A1 * | 1/2003 | Cheng | G02B 6/125 | 385/14 |
| 2003/0002795 A1 * | 1/2003 | Fisher | G02B 6/02066 | 385/37 |
| 2003/0012540 A1 * | 1/2003 | Kato | B23K 26/367 | 385/130 |
| 2003/0081922 A1 * | 5/2003 | Ide | G02B 6/132 | 385/129 |
| 2003/0194172 A1 * | 10/2003 | Khalil | G02B 6/3596 | 385/18 |
| 2003/0228104 A1 * | 12/2003 | Tabuchi | G02B 6/105 | 385/37 |
| 2004/0052461 A1 * | 3/2004 | Hunt | G02B 6/1228 | 385/43 |
| 2004/0114869 A1 * | 6/2004 | Fike | G02B 6/124 | 385/43 |
| 2004/0188794 A1 | 9/2004 | Gothoskar et al. | | |
| 2004/0251805 A1 | 12/2004 | Chen et al. | | |
| 2005/0001530 A1 * | 1/2005 | Kuo | B82Y 10/00 | 313/310 |
| 2005/0063634 A1 * | 3/2005 | Cohen | B29D 11/0075 | 385/14 |
| 2005/0201659 A1 * | 9/2005 | Strecker | G02B 6/29335 | 385/12 |
| 2005/0276536 A1 * | 12/2005 | Kochergin | B82Y 20/00 | 385/14 |
| 2006/0051047 A1 * | 3/2006 | Beall | C03C 10/0045 | 385/141 |
| 2007/0104411 A1 * | 5/2007 | Ahn | G02B 6/12004 | 385/14 |
| 2007/0237483 A1 * | 10/2007 | Nashimoto | H01S 3/063 | 385/132 |
| 2009/0084995 A1 * | 4/2009 | Cierullies | G01F 23/292 | 250/577 |
| 2009/0140168 A1 * | 6/2009 | Goehde | G01N 15/1436 | 250/483.1 |
| 2010/0019166 A1 * | 1/2010 | Kim | B82Y 10/00 | 250/396 R |
| 2010/0132887 A2 * | 6/2010 | Donnelly | B82Y 30/00 | 156/345.24 |
| 2010/0322610 A1 * | 12/2010 | Lusinchi | G03B 3/00 | 396/89 |
| 2012/0230168 A1 * | 9/2012 | Izawa | G02B 6/10 | 369/13.32 |
| 2013/0081447 A1 * | 4/2013 | Carter | G01N 9/00 | 73/30.01 |

\* cited by examiner

FACETED, GERMANIUM SLOTTED WAVEGUIDE

RELATED APPLICATIONS

This is a divisional of U.S. application Ser. No. 13/647,128 filed Oct. 8, 2012 and claims rights under 35 U.S.C. §119(e) from U.S. application Ser. No. 61/544,335 filed Oct. 7, 2011, the contents of which are incorporated herein by reference.

TECHNICAL FIELD

Various embodiments described herein relate to semi-conductor manufacturing generally, including manufacturing of waveguides for integrated circuits.

BACKGROUND

Waveguides are devices that transmit optical signals from one location to another within an integrated circuit. Waveguides have been implemented in electronic-photonic integrated circuits to decrease circuit size and increase circuit performance. Present methods for manufacturing waveguides involve etching a slot within a silicon wafer. Etching the silicon substrate, however, is difficult to control. Due to present etching methods, the waveguide slot may vary in depth along the length of the waveguide. Moreover, etching may also create non-uniform sidewalls. These waveguide defects or geometric irregularities may cause dispersion of the optical mode. As a result of the present inaccurate waveguide manufacturing methods, waveguide performance and/or efficiency may be adversely affected.

SUMMARY

When germanium grows on a silicon substrate it forms angled-facets. Applying this to the manufacture of waveguides, germanium may be grown in defined areas of a substrate to create a waveguide. In the present disclosure these areas of growth are defined lithographically. The germanium that grows in these defined regions forms the sidewalls of a slotted waveguide.

The germanium sidewalls and the silicon substrate may define a slotted waveguide having a uniform geometry. Uniform geometry may include the waveguide having sidewalk with a constant slope. The sidewalls may also have a smooth surface finish as a result of the germanium crystalline structure. In the preferred embodiment of the disclosure germanium is grown to form the sidewalk of the waveguide. These sidewalls may be faceted having a constant angular slope and creating a slotted waveguide having a slot with a trapezoidal cross section. Uniform geometry may include a waveguide having a constant or non-varying depth.

In one embodiment of this disclosure, the oxide on the bottom of the slot may be removed. In another embodiment of this disclosure, the oxide at the bottom of the slot may be present. In the latter case, no etching of the oxide is required, so there is no surface roughness of the bottom of the slot due to etching.

BRIEF DESCRIPTION OF THE DRAWINGS

Other objects, features and advantages will occur to those skilled in the art from the following description and accompanying drawings, in which.

DETAILED DESCRIPTION

Figure 1:
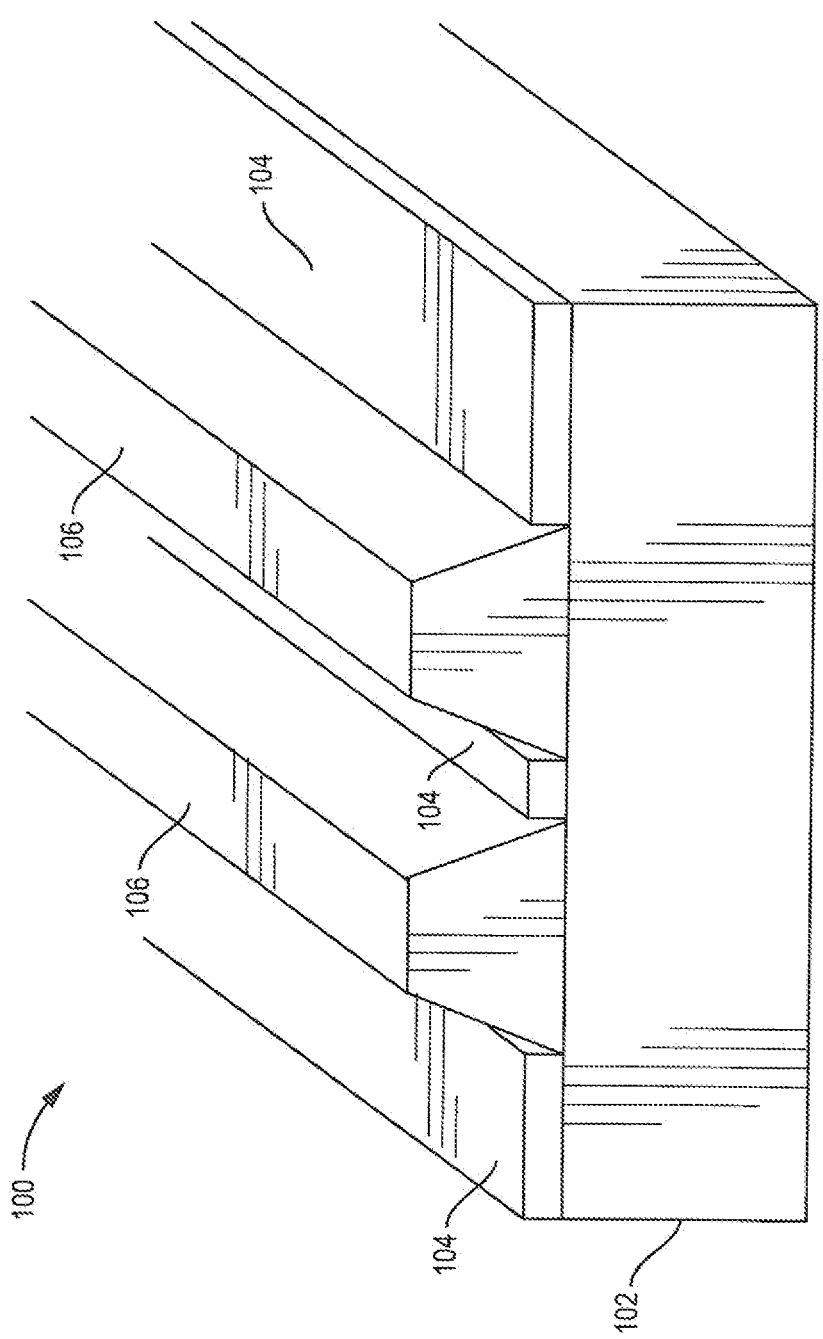
FIG. 1 is a perspective view of an exemplary embodiment of the waveguide of the present disclosure.

FIG. 1 is a perspective view of a waveguide 100 according to an exemplary embodiment of the present disclosure. The waveguide 100 having a uniform geometry may include but is not limited to a substrate 102, a protective layer 104, and a quantity of sidewalls 106.

The substrate 102 supports the waveguide components. In the preferred embodiment of the present disclosure the substrate 102 is silicon. The substrate 102 supports the components that form the waveguide 100. Waveguide components may include a protective layer 104 and sidewalls 106.

The protective layer 104 defines where germanium will not grow. Germanium will grow in regions where a protective layer of oxide is removed and the silicon substrate is thus exposed. Consequently, germanium can be grown on silicon to form the sidewalls of a slotted waveguide where the protective layer of oxide has been removed.

In one embodiment of this disclosure, the protective layer 104 and sidewalls 106 define a slotted waveguide allowing optical signals to travel from one place to another. In this embodiment, the protective layer 104 defines the bottom surface of the waveguide 100. Since the bottom of the waveguide is not etched in this case, the bottom of the waveguide is free of any roughness caused by the etching processes. The efficiency of the waveguide in transmitting an optical signal may be reduced if the bottom or sidewalls of the slotted waveguide are rough. Similarly, optical loss can occur if the sidewalls of the slot are rough. Sidewall roughness is reduced by growing the germanium sidewalls to form the slot, rather than etching a slot in solid waveguide.

In the preferred embodiment of the present disclosure the protective layer 104 is silicon dioxide because germanium does not grow on silicon dioxide. The protective layer 104 of oxide may be grown on the silicon substrate 102. Photoresist is applied to the oxide and patterned so that is does not cover two strips of oxide. The protective layer of oxide in the regions which are not covered by the photoresist mask is then removed by etching. Germanium is then grown on the exposed regions of the substrate 102 to create the sidewalls 106 of the waveguide 100.

The region between the germanium sidewalls 106 defines a slot allowing optical signals to travel from one place to another. Since the germanium is faceted, the sidewalls 106 nave a slope.

In the preferred embodiment of the disclosure, the sidewalls 106 are germanium. Germanium grows on silicon at a fixed angle depending on the orientation of the pattern of the protective layer 104 relative to the crystalline structure of the exposed silicon substrate 102. As a result, germanium sidewalls 106 have a faceted geometry and a constant slope. The sidewalls have a smooth surface finish as a result of germanium's crystalline structure. The germanium sidewalls 106 create a waveguide having a slot with a trapezoidal cross section.

The spacing or gap between the sidewalls 106 defines the width of the waveguide slot. This spacing is defined lithographically and can be very small, so that the waveguide slot is very narrow. The desired spacing between the sidewalls 106 may depend upon mode of the optical signal that is being transmitted through the waveguide 100.

In yet other embodiments of the present disclosure, the waveguide 100 may be included within integrated electrical circuits for transmitting optical signals from one location to another. These electrical circuits may be implemented in a variety of technology areas including, but not limited to aerospace and communication systems.

Figure 2:
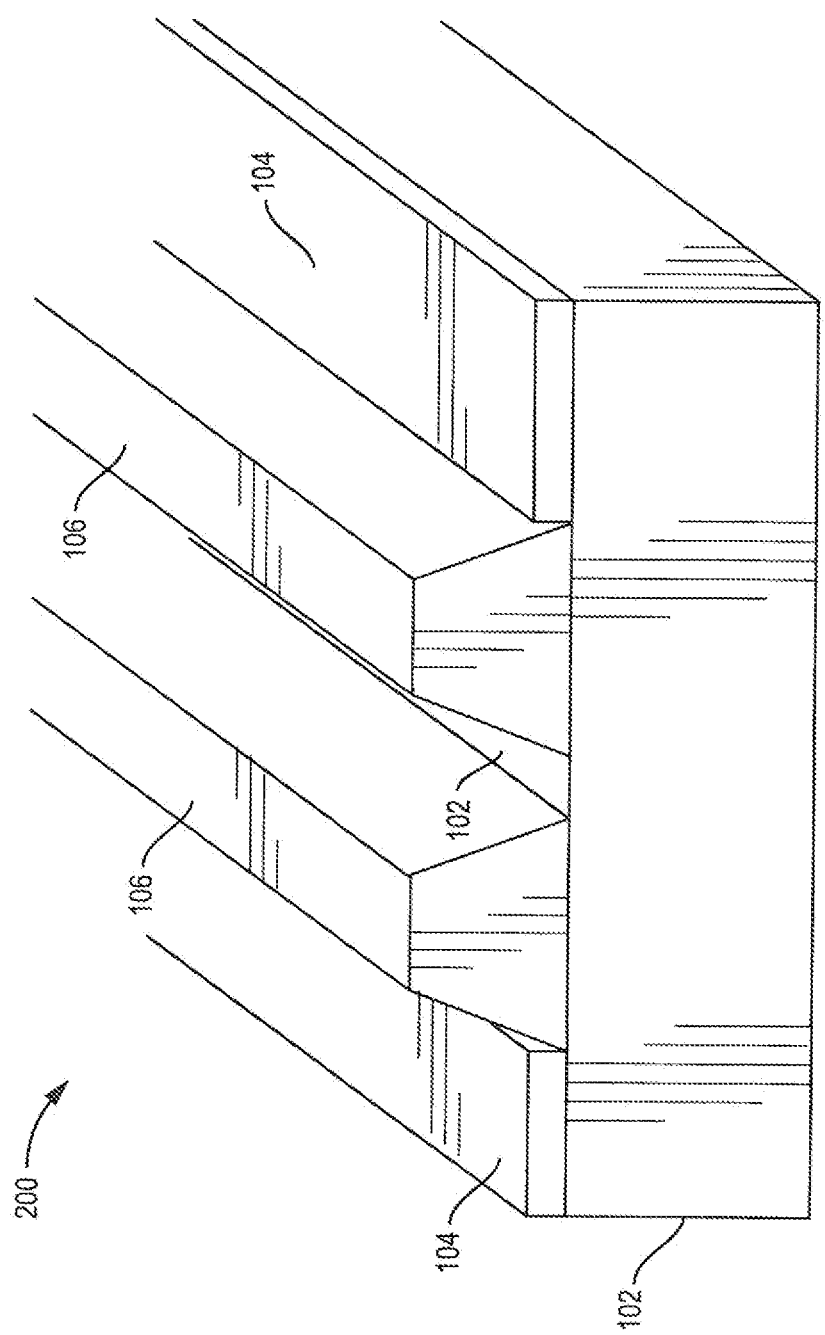
FIG. 2 is a perspective view of an exemplary embodiment of the waveguide of the present disclosure.

FIG. 2 is a perspective view of an alternate configuration of the waveguide of FIG. 1 according to an example embodiment of the present disclosure. In this embodiment the waveguide 100 the protective layer 104 located between sidewalls 106 is removed. The waveguide 100 was previously described in relation with FIG. 1 of this disclosure.

In this embodiment, the substrate 102 defines the bottom surface of the waveguide 100. Silicon as the bottom of the waveguide may influence the transmission of an optical signal differently than oxide at the bottom of the waveguide.

Figure 3:
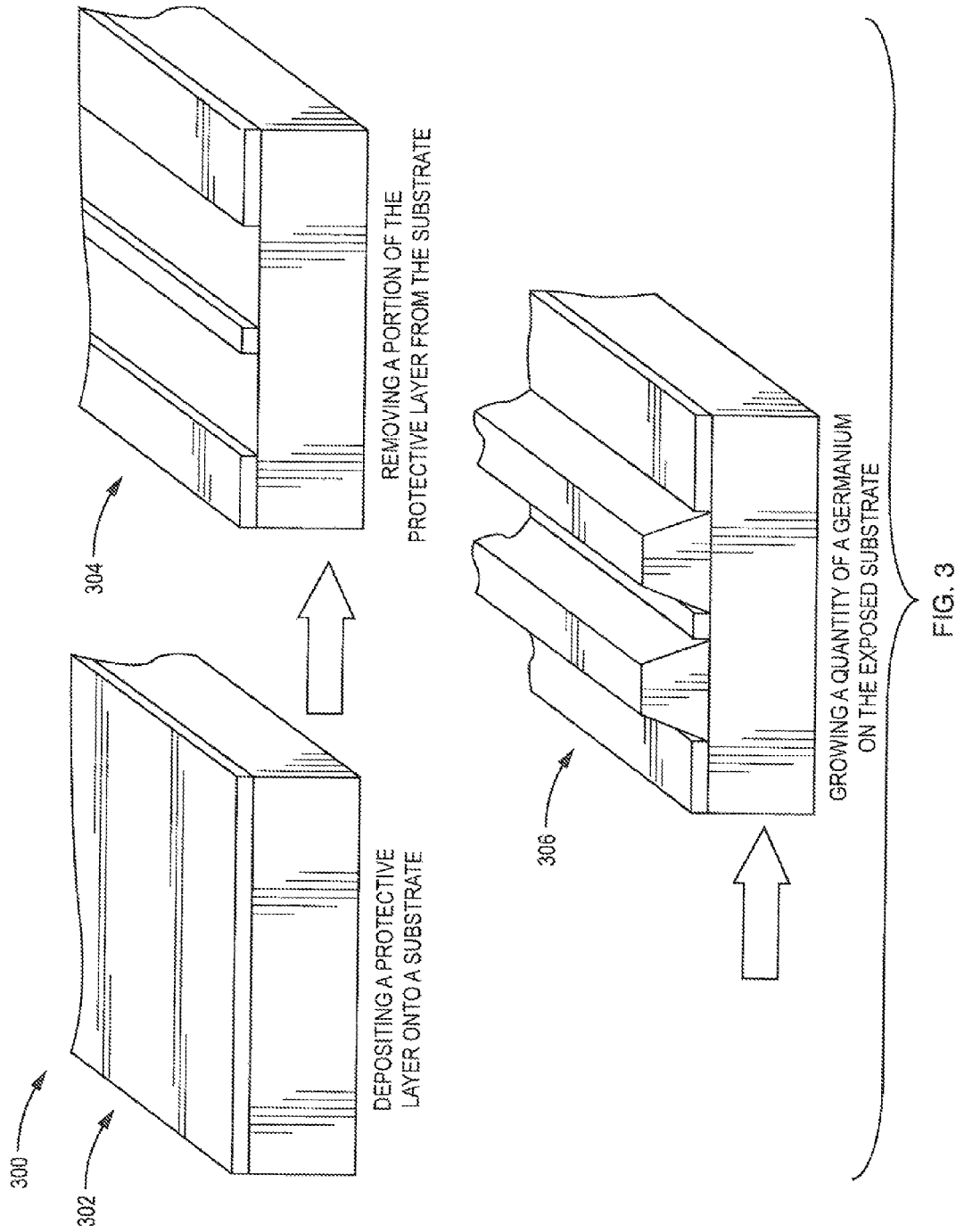
FIG. 3 is a flow diagram of a method for manufacturing a waveguide according to an example embodiment of the present disclosure.

FIG. 3 is a flow diagram for a method for manufacturing a waveguide 300 according to an example embodiment of the present disclosure. At block 302 a quantity of a protective layer is grown, or deposited, on a substrate. In the preferred embodiment of the present disclosure the protective layer may be a quantity of oxide that is grown on a silicon substrate.

At block 304 a quantity of the protective layer may be removed to expose a quantity of the substrate. The portion of the protective layer is removed to provide an exposed surface of the substrate for growing a quantity of germanium on the substrate. The protective layer may be removed from the substrate in bulk or selectively. Portions of the protective layer may be removed using any method capable of removing the protective layer from the substrate without damaging the substrate. Methods for removing the protective layer from the substrate may include but are not limited to: wet etching, dry etching or chemical etching. The exposed area of the substrate may be any shape capable of supporting waveguide function.

In the preferred embodiment of the present disclosure, a protective layer of oxide is grown on a silicon substrate. A photoresist may be applied to the oxide layer. After patterning and exposing the photoresist, the oxide not covered by the photoresist mask is etched down to the silicon substrate. The exposed portions of the oxide layer may be removed to expose a portion of the substrate using a etching process. This process leaves two closely spaced strips of silicon separated by a quantity of oxide. The two exposed strips of silicon substrate provide a location for the waveguide sidewalls.

At block 306 germanium is grown on the exposed areas of the substrate to form the waveguide sidewalls. In the preferred embodiment of the present invention a quantity of germanium may be grown on the two closely-space strips of the exposed substrate to form the sidewalls of the waveguide. The substrate may be initially preconditioned with a hydrogen gas. The temperature of the substrate may then be decreased, and germane gas may flow over the substrate to form an intrinsic germanium seed layer. Next, a mixture of germane and phosphine gases can be flowed over the intrinsic germanium seed layer to produce an n-doped germanium seed layer. Then a bulk germanium layer can be grown on top of the doped germanium seed layer. In yet other embodiments of the present disclosure, a mixture of diborane and germane gases can be flowed over the intrinsic germanium seed layer to produce a p-doped germanium seed layer.

Further teachings and descriptions of the methods for growing a quantity of germanium on a substrate are provided in the contents of U.S. Application Publication No. 2011/0036289 A1 filed Aug. 11, 2009, which is incorporated herein by reference. This reference and all other referenced patents and applications are incorporated herein by reference in their entirety. Furthermore, where a definition or use of a term in a reference, which is incorporated by reference herein is inconsistent or contrary to the definition of that term provided herein, the definition of that term provided herein applies and the definition of that term in the reference does not apply.

Figure 4:
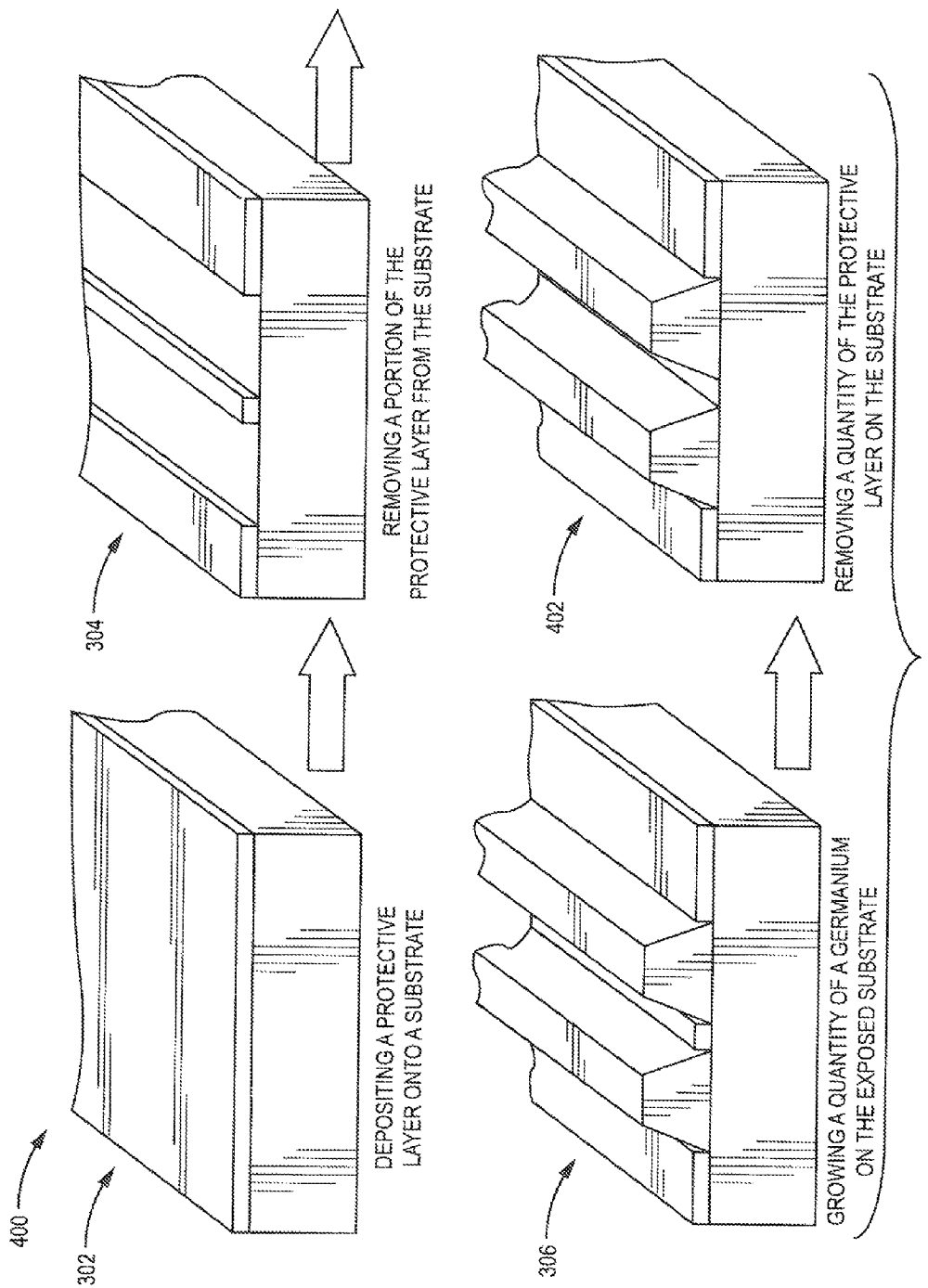
FIG. 4 is a flow diagram of method for manufacturing a waveguide according to an alternate embodiment of the present disclosure.

FIG. 4 is a flow diagram of an alternate method for manufacturing a waveguide 400 according to an example embodiment of the present disclosure. At block 402 the protective layer located between the waveguide sidewalls may be removed from the substrate. Methods for removing the protective layer from the substrate may include but are not limited to wet etching, dry etching or chemical etching. The method steps for manufacturing a waveguide 300 were previously described in relation to FIG. 3 of this disclosure.

While the present disclosure has been described in connection with the preferred embodiments of the various figures, it is understood that other similar embodiments may be used or modifications or additions may be made to the described embodiments for performing the same function of the present disclosure without deviating therefrom. Therefore, the present disclosure should not be limited to any single embodiment, but rather construed in breadth and scope in accordance with the recitation of the appended claims.

It may be possible to execute the activities described herein in an order other than the order described. And, various activities described with respect to the methods identified herein can be executed in repetitive, serial, or parallel fashion.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

Other embodiments will occur to those skilled in the art and are within the following claims.

What is claimed is:

1. A method for manufacturing a waveguide, comprising:
   providing a substrate;
   depositing a protective layer onto the substrate;
   removing a portion of the protective layer from the substrate to expose a plurality of areas on the surface of the substrate;
   growing a first quality of germanium in a first area on the surface of the substrate to form a first sidewall having a uniform slope; and
   growing a second quality of germanium in a second area on the surface of the substrate to form a second sidewall having a uniform slope, wherein the first sidewall, the second sidewall, and the top of the protective layer define the waveguide.

2. The method of claim 1, wherein the waveguide comprises a plurality of slots with trapezoidal sections.

3. The method of claim 1, wherein the protective layer comprises an oxide.

4. The method of claim 1, wherein the substrate comprises silicon.

5. The method of claim 1, wherein the substrate of the sidewall is smooth.

6. The method of claim 1, wherein the waveguides have a uniform depth.

7. The method of claim 1, wherein the step of growing germanium comprises growing crystal line germanium.

8. The method of claim 1, further comprising forming an intrinsic germanium seed layer.

9. The method of claim 1, further comprising forming a doped germanium seed layer.

* * * * *